US007003424B2

(12) United States Patent
Ravatin et al.

(10) Patent No.: US 7,003,424 B2
(45) Date of Patent: Feb. 21, 2006

(54) TEMPERATURE DETECTION CELL, AND METHOD TO DETERMINE THE DETECTION THRESHOLD OF SUCH A CELL

(75) Inventors: François Ravatin, La Murette (FR); Charles Vera, Pierre-Benite (FR); Marco Cioci, Pavia (IT)

(73) Assignee: STMicroelectronics SA, Montrouge (FR)

(*) Notice: Subject to any disclaimer, the term of this patent is extended or adjusted under 35 U.S.C. 154(b) by 0 days.

(21) Appl. No.: 10/883,635

(22) Filed: Jul. 1, 2004

(65) Prior Publication Data

US 2005/0038625 A1 Feb. 17, 2005

(30) Foreign Application Priority Data

Jul. 7, 2003 (FR) .................................. 03 08256

(51) Int. Cl.
*G01K 1/00* (2006.01)

(52) U.S. Cl. ...................................... 702/132; 702/130

(58) Field of Classification Search ................ 702/130, 702/132, 136, 117, 57, 58, 64, 65; 365/211, 365/212; 323/314, 316
See application file for complete search history.

(56) References Cited

U.S. PATENT DOCUMENTS

| | | | | |
|---|---|---|---|---|
| 4,574,205 A | | 3/1986 | Nagano | 307/310 |
| 5,422,832 A | * | 6/1995 | Moyal | 702/132 |
| 6,442,500 B1 | | 8/2002 | Kim | 702/132 |
| 6,583,607 B1 | * | 6/2003 | Marty et al. | 323/273 |
| 6,724,176 B1 | * | 4/2004 | Wong et al. | 323/316 |

FOREIGN PATENT DOCUMENTS

| | | |
|---|---|---|
| EP | 0458332 | 11/1991 |
| EP | 1081477 | 3/2001 |
| WO | 99/12010 | 3/1999 |
| WO | 02/08708 | 1/2002 |

OTHER PUBLICATIONS

Riedijk et al., An Integrated Absolute Temperature Sensor with Sigma-Delta A-D Conversion, Sensors and Actuators A, Elsevier Sequoia S.A., Lausanne, CH, vol. A34, No. 3, Sep. 1, 1992, pp. 249-256.

* cited by examiner

*Primary Examiner*—Bryan Bui
(74) *Attorney, Agent, or Firm*—Lisa K. Jorgenson; Allen, Dyer, Doppelt, Milbrath & Gilchrist, P.A.

(57) ABSTRACT

A temperature detection cell includes a circuit for producing a voltage that increases with temperature, a circuit producing a voltage that decreases with temperature, and a comparison circuit to compare the increasing voltage with the decreasing voltage. The comparison circuit produces a warning signal when the temperature reaches a detection threshold such that the decreasing voltage becomes lower than the increasing voltage. The cell also has a test circuit to determine the detection threshold of the cell. Also disclosed is a method for testing a temperature detection cell, during which the detection threshold of a cell is determined from measurements of the increasing voltage and the decreasing voltage at a reference temperature.

27 Claims, 1 Drawing Sheet

TEMPERATURE DETECTION CELL, AND METHOD TO DETERMINE THE DETECTION THRESHOLD OF SUCH A CELL

FIELD OF THE INVENTION

The invention relates to a temperature detection cell for an integrated circuit, and an associated method for determining the real detection threshold of such a cell. The invention is used, for example, in integrated circuits for cell phones. It can also be used more generally in any integrated circuit that dissipates heat.

BACKGROUND OF THE INVENTION

Temperature detection cells are generally used in integrated circuits as alarms to indicate an abnormal heating of these integrated circuits. The use of such cells makes it possible to stop the operation, and therefore, the heating of the integrated circuit before it is damaged as a result of the heat.

The principle of operation of such a cell is summarized in FIG. 1. The cell has a circuit producing a voltage VR that increases with the temperature T, and is compared with a voltage VBEON that diminishes with the temperature T. At ambient temperature T0, VBEON is higher than VR. When the temperature in the vicinity of the cell increases, the two voltages approach each other and the cell produces an alarm signal VOUT when the voltage VBEON becomes lower than the voltage VR (detection threshold TD).

An example of such a cell is shown in FIG. 2. It comprises a current source 11, three N-type transistors MN1, MN2, MN3, two P-type transistors MP1, MP2, one bipolar transistor Q1, one resistor R and two inverters 12, 13.

A power supply potential VPLUS is applied to one of the terminals of the source 11 whose other terminal is connected to the drain of the transistor MN1. The potential VPLUS is also applied to the source of the transistor MP1 whose drain is connected to one of the terminals of the resistor R having its other terminal connected to the drain of MN2. The potential VPLUS is also applied to the source of MP2 whose drain is connected to the drain of MN3. The gates of MP1 and MP2 are connected together to the drain of MP1.

The emitter of Q1 is connected to the common point of the resistor R and of the transistor MP1. The base of Q1 is connected to the common point of the resistor R and of the transistor MN2. The gates of the transistors MN1, MN2, MN3 are connected together to the common point of MN1 and of the current source 11. The two inverters 12, 13 are series-connected. The input of the inverter 12 is connected to the common point of MP2 and MN3, and the output of the inverter 13 forms the output VOUT of the detection cell. The inverters 12, 13 simply have the effect of converting the analog potential VComp present at the common point of the transistors MP2, MN3 into a digital signal VOUT which is inactive if the temperature is below the detection threshold TD of the cells, and is active if not. Finally, a ground potential VMINUS is applied to the source of the transistors MN1, MN2, MN3 and the collector of the transistor Q1.

The transistors MN1, MN2 are identical and form a current mirror. The current I produced by the source 11 crosses the transistor MN1 which copies it into the transistor MN2. The current I thus flows in the resistor R. The transistors MP1, MP2 are identical and also form a current mirror. The current flowing in the transistor MP, which is equal to the sum of the current flowing in the resistor R and the current flowing in the emitter of the transistor Q1, is copied into the transistor MP2. Finally, the transistors MN1, MN3 also form a current mirror. However, the transistor MN3 is chosen such that the current copied out into the transistor MN3, proportional (according to the principle of the current mirror) to the current I flowing in the transistor MN1, is also slightly greater than the current flowing in MP2. The transistor Q1 has a base-emitter voltage VBEON that decreases with the temperature (FIG. 1). This is a well-known characteristic of bipolar transistors.

The current source 11 is formed according to a known scheme using bipolar transistors. The current I produced by the source 11 is proportional to the difference (referenced ΔVBE) between the base-emitter voltages of two bipolar transistors, and the current I increases with the temperature. This is due to the well-known temperature characteristics of the bipolar transistors. I=ΔVBE/RI is written, with RI being a constant. The current source 11, the transistors MN1, MN2 and the resistor R together form the circuit that produces a voltage VR increasing with the temperature (FIG. 1). ΔVBE, I and VR follow the same progress as a function of the temperature.

In normal operation, the current I given by the source 11 is low, so that the voltage VR at the terminals of R (equal to R*I) is low and the transistor Q1 is off. The current in the emitter of Q1 is therefore zero and the current flowing in the transistors MP1, MP2 is equal to I. Finally, the current I flowing in MN1 is copied out into MN3. Since the current flowing in MN3 is greater (MN3 has been chosen accordingly) than the current I flowing in the transistor MP2, the common point of the transistors MP2, MN3 is brought to the potential VMINUS and the output VOUT is equal to a logic zero. When the temperature rises, the voltage VR and the current I rise, while the potential VBEON diminishes.

When the temperature crosses the detection threshold TD of the cell, the current I produced by the source 11 is great. It is such that the voltage VR is higher than the conduction threshold VBEON of the transistor Q1 which comes on. A current flows in the transistor Q1 and is added to the current I in the transistor MP2. The current I added to the current flowing in the emitter of Q1 is copied into MP2. Since the current flowing in MP2 is greater than the current flowing in MN3, the current MP2 draws the common point of the transistors MP2, MN3 to the potential VPLUS and the output VOUT becomes equal to a logic one. This indicates that the temperature has reached the detection threshold TD. The detection threshold TD is reached when the temperature is such that the voltage VR becomes equal to the emitter-base voltage at which Q1 comes on and conducts a current.

One problem with present-day detection cells is the variation of the detection threshold from one cell to another. Despite all the care taken in designing a series of cells, the values of the resistors, the voltages ΔVBE, VBEON of the bipolar transistors vary by a few percentage points from one cell to another in the same production line. Due to these variations in parameters, the voltages produced by the bipolar transistors and the currents produced by the bipolar transistors or copied by the current mirrors also vary from one cell to another. These errors generally accumulate and finally have a considerable influence on the value of the detection threshold of the cell.

It is noted that for a series of cells sized to have a given theoretical detection threshold TD, it is possible to have cells whose real detection threshold diverges by 20% to 30% from the desired value, which is unacceptable for certain applications. The only way to guarantee the value of the detection threshold of the cell is to measure it.

At present, the only known test method (the measurement of the temperature threshold TD) for a cell is a test in real conditions in which the temperature in the neighborhood of the cell is gradually increased until it reaches the detection threshold. For obvious reasons of cost and time, such a test is performed on a very limited sample of cells coming from a same production batch of several tens of thousands of cells. This does not guarantee that the detection threshold of the cell is taken individually.

SUMMARY OF THE INVENTION

An object of the invention is to form a cell that integrates a test circuit to precisely determine the temperature detection threshold of the cell.

Another object of the invention to obtain a method for the measurement of the detection threshold of such a cell.

These and other objects are achieved with a temperature detection cell comprising a circuit producing a voltage that increases (VR) with the temperature, a circuit producing a voltage (VBEON) that decreases with the temperature, and a comparison circuit to compare the increasing voltage with the decreasing voltage and produce a warning signal when the temperature reaches a detection threshold such that the decreasing voltage becomes lower than the increasing voltage (VR).

According to the invention, the cell may also have a test circuit to determine the detection threshold of the cell. Thus, and unlike in known cells, a cell according to the invention may comprise a test circuit to determine the real value of the detection threshold of the cell with precision. This test circuit may be used for example at the exit from the production line to test the cells individually.

More specifically, according to the invention, the detection threshold may be computed from measurements of the increasing voltage and the decreasing voltage (VBEON0) at ambient temperature. It is thus no longer necessary to test the cell at high temperature (with a threshold of about 100 to 200° C.). Measurements at ambient temperature are sufficient. The cells can thus be tested at low cost.

The circuit producing a decreasing voltage is made, for example, in the same way as in a known cell (transistor Q1, FIG. 2). The comparison circuit may also be made according to the known diagram of FIG. 2.

According to a preferred embodiment of the cell according to the invention, the circuit producing the increasing voltage (VR) comprises a first current source producing the current (I=ΔVBE/R0) that increases with the temperature and, at a given temperature, increases as a function of a control potential applied to the first current source. A resistor receives the current and has the increasing voltage produced at its terminals.

Using a control voltage to drive the current source enables the powering-on point of the transistor Q1 to be shifted. This amounts to simulating a rise in temperature.

According to the preferred embodiment of the invention, the test circuit may comprise a second current source and a test resistor that receives the current produced by the second source and has a voltage produced at its terminals at the reference temperature. This voltage may be proportional to the increasing voltage when the control potential has no effect on the current produced by the first source and the second source, and may be proportional to the decreasing voltage (VBEON) when the first source and the second source (22) are controlled by a control potential such that the increasing voltage is equal to the decreasing voltage at the reference temperature.

The second current source may be, for example, identical to the first current source. The second current source can also be a current mirror that is formed for example by PMOS transistors and copies out the current produced by the first current source.

Another aspect of the invention is to provide a method for determining a detection threshold (TD) of each temperature detection cell of a series of one or more cells coming from a same manufacturing process. Each cell to be tested may comprise a circuit to produce an increasing voltage as a function of the temperature, a circuit to produce a decreasing voltage as a function of the temperature, and a comparator to give a warning signal when the increasing voltage reaches the decreasing voltage signifying that the detection threshold has been reached.

The method according to the invention may comprise the following steps. During a resetting step, constant coefficients X, Y related to the series of cells are determined, and during a test step, the detection threshold of the cell is determined from measurements of the increasing voltage and the decreasing voltage at a reference temperature. Only measurements at ambient temperature may be necessary to perform the test step. The implementation of this step therefore costs little.

Preferably, the test step is repeated for each cell of the series of cells. The resetting step can then be performed only once before the test steps. Thus, limits are placed on the number of steps to be performed when several cells have to be tested in succession. The resetting step can also be repeated before each test step. Thus, as shall be seen more clearly below, the precision of the value of the detected threshold temperature is improved.

During the test step, the detection threshold is computed according to the relationship:

$$TD=T0+(VS2-VS1)/(X-Y)$$

T0 is the reference temperature, X, Y are the coefficients determined during the resetting step, VS1 is an image of the increasing voltage (VR) at the reference temperature, and VS2 is an image of the decreasing voltage (VBEON) at the reference temperature.

BRIEF DESCRIPTION OF THE DRAWINGS

The invention will be understood more clearly and other features and advantages shall appear from the following description of an example of an implementation of a temperature detection cell and of a method for testing such a cell according to the invention. The description must be read with reference to the appended drawings, of which.

DETAILED DESCRIPTION OF THE PREFERRED EMBODIMENTS

Figure 1:
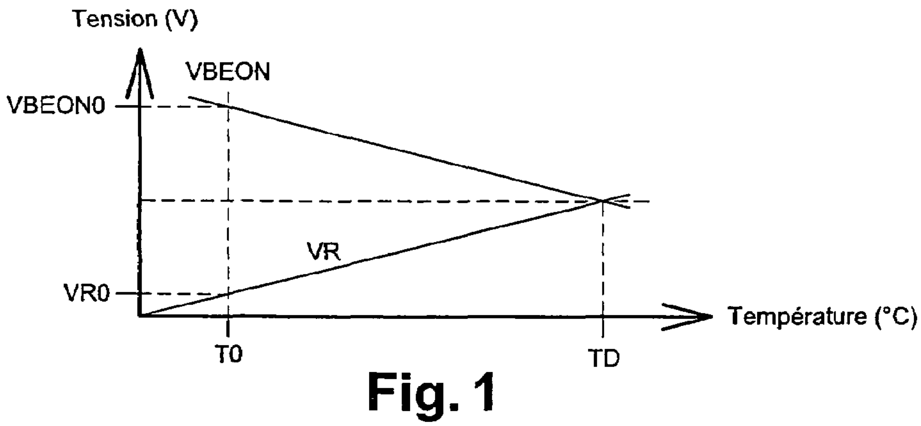
FIG. 1 is a graph showing the progress of two voltages within a prior art detection cell.
Figure 2:
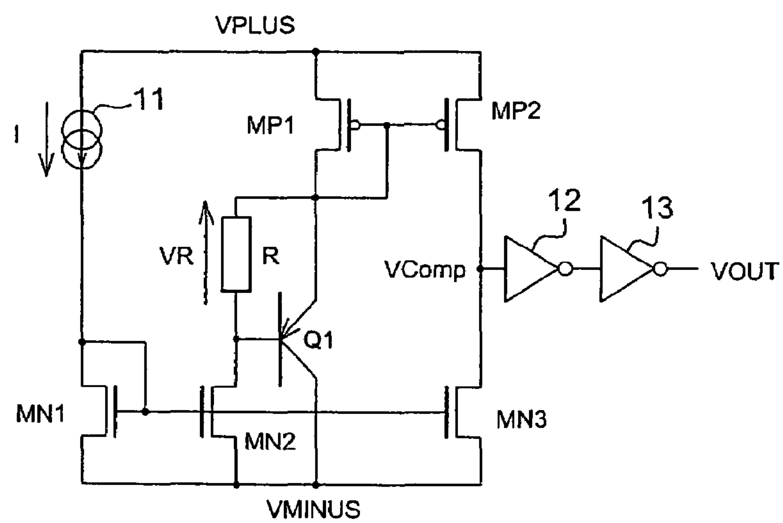
FIG. 2 is a schematic diagram of a prior art detection cell.

To obtain a detection cell according to the invention (FIG. 3), a prior art cell (FIG. 2) was modified as follows. The current source 11 was replaced by a current source 21 made according to a scheme similar to the one used for the source 11 of the prior art cell. As compared with the source 11, the source 21 can be controlled by a potential VF. The source 21 produces a current I which is 1) increasing linearly as a function of the temperature for a given value VF0 of the potential VF, and 2) variable as a function of the potential VF for a given value T0 of the temperature T.

Furthermore, a second current source 22 and a resistor RS connected in series have been added. The potential VPLUS is applied to a terminal of the source 22 having its other terminal connected to a terminal of the resistor RS. The ground potential VMINUS is applied to the other terminal of the resistor RS. The source 22 is identical to the source 21. In particular, it produces a current I that progresses in the same way as a function of the temperature and of the potential VF.

Before describing the working of the cell according to the invention, and also the test method of the cell, a lengthier description needs to be made from a theoretical viewpoint, of the behavior of the different components of the cell as a function of temperature.

Figure 3:
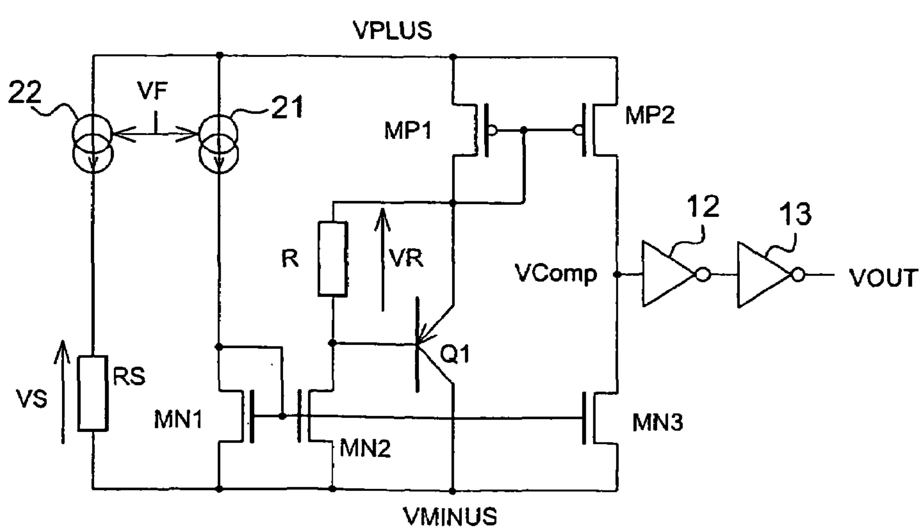
FIG. 3 is a drawing of a detection cell according to the invention.

In the example of FIG. 3, the transistors MN1, MN2, the source 21 and the resistor R form a circuit that produces a voltage VR which is linear and increases with the temperature. Indeed, since the current I produced by the source 21 is linear as a function of the temperature for a given value VF, it follows that the voltage VR at the terminals of the resistor R is also linear for a given value of VF:

$$VR=A*T+C$$

T is the temperature, and A, C are constants.

The current I is zero at (absolute) temperature equal to zero, and it is deduced therefrom that C=0. Furthermore, in writing VR0 to denote the value of VR at a reference temperature T0 (for example, ambient temperature in the range of 15° C. to 25° C.), it is possible to write: A=VR0/T0, and therefore VR=VR0/T0*T.

VR0 is proportional to a coefficient ΔVBE0 proper to the source 21 and to a ratio of resistance values R/RB. ΔVBE0 is a constant coefficient, independent especially of the manufacturing process, for the same reasons as above. If the resistance values R and RB are sensitive to the process, the ratio R/RB has little dependence (about 1 to 2%), so that VR0 and A are considered to be constants.

In the example of FIG. 3, the transistor Q1 forms a circuit that produces a linear voltage VBEON that decreases as a function of the temperature. Indeed, the emitter-base voltage VBEON of the bipolar transistor Q1 is linearly variable with the temperature. We can write:

$$VBEON=B*T+D.$$

B and D are coefficients to be determined. B is a constant coefficient, independent especially of the manufacturing process. D on the contrary is sensitive to the manufacturing process and may thus vary from one cell to another.

In the example of FIG. 3, the transistors MP1, MP2 and MN3 and the inverters 12, 13 form a circuit for the comparison of the voltage VR and the voltage VBEON, as illustrated above in the description of FIG. 2.

When the temperature reaches the detection threshold TD, we have:

$$VTD=VR(T=T0)=VBEON(T=TD)$$

That is:

$$VR0=A*T0+C;\ VBEON0=B*T0+D$$

$$VTD=A*TD+C;\ VTD=B*TD+D$$

It is deduced therefrom that:

$$A=(VTD-VR0)/(TD-T0)$$

$$B=(VTD-VBEON0)/(TD-T0)$$

Hence:

$$\begin{aligned}(A-B)*(TD-T0)&=VTD-VR0-VTD+VBEON0\\&=VBEON0-VR0\end{aligned}$$

That is, again:

$$TD=T0+(VBEON0-VR0)/(A-B).$$

It may be recalled that, for T=T0, VBEON0 is the base-emitter voltage of the transistor Q1 and that VR0 is the current produced by the sources 21 and 22 multiplied by a coefficient. Since the coefficients A and B are independent of the process, they are constant for a same series of cells.

In the example of FIG. 3, the source 22 and the resistor RS form a test circuit which, at a given temperature T, can be used to measure first the voltage VR0 at the terminals of R, and secondly the voltage VBEON0 for powering on the transistor Q1.

The currents flowing in the resistors R and RS are identical at a given temperature T and a given value VF of the control potential of the current sources. It is therefore possible, for a given value VF and a given temperature, to write:

$$VS=RS/R*VR.$$

VS1 denotes the value of the voltage VS when the value (VF1) of the potential VF is such that the sources 21, 22 are not controlled (potential VF without effect). We have:

$$VS1=RS/R*VR \text{ for } VF=VF1.$$

Furthermore, at a given temperature T, the voltage VBEON of Q1 is equal to the voltage VR at the point in time when the transistor Q1 comes on. VS2 denotes the value of the voltage VS such that the current produced by the source 21 and going through the resistor R is sufficient for VR=VBEON. This is obtained by choosing an appropriate value (VF2) of VF. We have:

$$VS2=RS/R*VBEON.$$

The temperature TD can be expressed as a function of T0, VS1 and VS2:

$$\begin{aligned}TD&=T0+(VBEON0-VR0)/(A-B)\\&=T0+(R/RS*VS2-R/RS*VS1)/(A-B)\\&=T0+(VS2-VS1)/(RS/R*A-RS/R*B)\\&=T0+(VS2-VS1)/(X-Y)\ \text{with}\\X&=RS/R*A \text{ and } Y=RS/R*B\end{aligned}$$

The method according to the invention uses the last relationship, for each temperature detection cell produced and on the basis of measurements of ambient temperature of VS2 and VS1, and hence of VBEON0 and VR0, to determine the detection threshold TD of the cell.

Thus, the method according to the invention comprises a first resetting step during which two parameters X, Y are determined. These two parameters are associated with one or more cells of the same series having identical characteristics. A second step during which, for each cell: the value of VS2 and VS1 are measured and then, the value of the temperature threshold TD of each cell is measured. If it is desirable, the cells having a real temperature threshold TD far too different from the desired. threshold and are considered to be defective are discarded.

The resetting step can be done only once for a set of cells coming from a same manufacturing process. The number of steps, and hence the total duration of the method, is limited.

The resetting step can also be repeated for each cell. The implementation of the method is slightly longer, but greater precision is obtained on the value of the threshold TD. The method indeed eliminates the small variations of the coefficients X, Y (caused by the small variations in the ratios of the resistance values RS/R from one cell to another).

Resetting of the method: determining of X, Y: A=VR0/T0, and VR0 is the value of VR at the reference temperature T0. Now, at the temperature T0, VS1(T0)=RS/R*VR0. The following is deduced therefrom:

$$X = VS1(T=T0)/T0.$$

X is thus obtained by measuring the voltage VS1(T0) at the terminals of the resistor RS at a temperature equal to T0 and when the sources 21, 22 are not controlled, and then by dividing the result of the measurements by T0.

B is the slope of the curve VBEON=B*T+D. Since VS2=RS/R*VBEON, we can write:

$$VS2 = RS/R*B*T+D = Y*T+RS/R*D.$$

Y is therefore the slope of the straight line VS2 as a function of the temperature. It may be recalled that, at a given temperature, VS2 is the voltage at the terminals of the resistor RS when the current produced by the source 21 or the source 22 is such that the voltage at the terminals of R is equal to the power-on voltage VBEON of the transistor Q1.

According to the method of the invention, Y is determined from two measurements of VS2 at two different temperatures on a same cell. If necessary, if greater precision is desired on the value of Y, it is also possible to perform more than two measurements on the same cell and/or carry out measurements on different cells to be tested, and then finally carry out a statistical determination of Y as a function of the set of measurements of VS2 performed.

Testing of a series comprising one or more cells: For each cell, a measurement is made first of all of the voltage VS1 (the image of VR), and then of the voltage VS2 (the image of VBEON) at the ambient temperature T0.

VS1 is measured as in the resetting step. Since the value of the potential VF is such that VF has no effect on the sources 21, 22, the voltage is measured at the terminals of the resistor RS, and this voltage is equal to VS1.

The voltage VS2 is then measured at the temperature T0, according to the same mode of operation as in the resetting phase. The potential VF is varied to increase the current I following in the resistor R and in the resistor RS, and VS2 is measured at the instant when the transistor Q1 starts turning on.

Then, for each cell to be tested, the exact temperature threshold TD is determined by computation according to the relationship:

$$TD = T0 + (VS2 - VS1)/(X - Y)$$

X, Y are the coefficients determined during the resetting step.

It will be noted that, with the invention, the temperature threshold (100–200° C.) of a cell or cells is determined solely from measurements at ambient temperature (20–30° C.). Only some measurements (at least one and in any case a small number of measurements will suffice) at temperatures greater than the ambient temperature must be performed during the resetting phase to determine the coefficient Y. These few measurements at higher temperature however can easily be made far upstream, for example on a laboratory prototype, outside any manufacturing process. A test according to the invention can easily be made at the end of the production line, on all the cells produced, to ensure the value of this threshold with a low error rate.

The invention claimed is:

1. A temperature detection cell comprising:
- a first temperature circuit for producing a voltage that increases with temperature, said first temperature circuit comprising
  - a first current source for producing a first current that increases with the temperature, and at a given temperature, increases as a function of a received control potential, and
  - a first resistance for receiving the first current and for providing the increasing voltage across its terminals;
- a second temperature circuit for producing a voltage that decreases with the temperature;
- a comparison circuit for comparing the increasing voltage with the decreasing voltage, and for producing a warning signal when the temperature reaches a detection threshold such that the decreasing voltage becomes lower than the increasing voltage; and
- a test circuit for determining the detection threshold and comprising
  - a test current source for producing a test current, and
  - a test resistance for receiving the test current and having a test voltage produced across its terminals at a reference temperature, the test voltage being proportional to the increasing voltage when the control potential has no effect on the first current and the test current produced by said first and test current sources, and being proportional to the decreasing voltage when said first and test current sources are controlled by the control potential such that the increasing voltage is equal to the decreasing voltage at the reference temperature.

2. A temperature detection cell according to claim 1, wherein the reference temperature comprises an ambient temperature.

3. A temperature detection cell according to claim 1, wherein said first temperature circuit further comprises a pair of MOSFETs connected together as a current mirror, said current mirror being connected to said first current source and to said first resistance.

4. A temperature detection cell according to claim 1, wherein said second temperature circuit comprises a bipolar transistor connected to said first temperature circuit and to said comparison circuit.

5. A temperature detection cell according to claim 1, wherein said comparison circuit comprises a pair of MOSFETs connected together as a current mirror, said current mirror being connected to said first and second temperature circuits.

6. A temperature detection cell comprising:
- a first temperature circuit for producing a voltage that increases with temperature;
- a second temperature circuit for producing a voltage that decreases with the temperature;

a comparison circuit for comparing the increasing voltage with the decreasing voltage, and for producing a warning signal when the temperature reaches a detection threshold such that the decreasing voltage becomes lower than the increasing voltage; and a test circuit for determining the detection threshold and comprising a test current source for producing a test current, and a test resistance for receiving the test current and having a test voltage produced across its terminals at a reference temperature, the test voltage being proportional to the increasing voltage based upon a first condition and being proportional to the decreasing voltage based upon a second condition.

7. A temperature detection cell according to claim 6, wherein said first temperature circuit comprises:

a first current source for producing a first current that increases with the temperature, and at a given temperature, increases as a function of a received control potential; and a first resistance for receiving the first current and for providing the increasing voltage across its terminals.

8. A temperature detection cell according to claim 7, wherein the test voltage is proportional to the increasing voltage at the first condition when the control potential has no effect on the first current and the test current produced by said first and test current sources, and is proportional to the decreasing voltage at the second condition when said first and test current sources are controlled by the control potential such that the increasing voltage is equal to the decreasing voltage at the reference temperature.

9. A temperature detection cell according to claim 6, wherein the reference temperature comprises an ambient temperature.

10. A temperature detection cell according to claim 6, wherein said first temperature circuit further comprises a pair of MOSFETs connected together as a current mirror, said current mirror being connected to said first current source and to said first resistance.

11. A temperature detection cell according to claim 6, wherein said second temperature circuit comprises a bipolar transistor connected to said first temperature circuit and to said comparison circuit.

12. A temperature detection cell according to claim 6, wherein said comparison circuit comprises a pair of MOSFETs connected together as a current mirror, said current mirror being connected to said first and second temperature circuits.

13. A method for determining a detection threshold for each temperature detection cell in a series of temperature detection cells coming from a same manufacturing process, each temperature detection cell comprising a first temperature circuit for producing an increasing voltage as a function of temperature, a second temperature circuit for producing a decreasing voltage as a function of the temperature, and a comparison circuit for providing a warning signal when the increasing voltage reaches the decreasing voltage signifying that the detection threshold has been reached, the method comprising:

during a resetting step, determining a plurality of constant coefficients related to the series of temperature detection cells; and during a testing step, determining the detection threshold of each temperature detection cell based upon measurements of the increasing voltage and the decreasing voltage at a reference temperature and the plurality of temperature coefficients.

14. A method according to claim 13, wherein the testing step is repeated for each temperature detection cell in the series of temperature detection cells; and wherein the resetting step is performed only once before the testing step.

15. A method according to claim 13, wherein the resetting step and the testing step are repeated for each temperature detection cell in the series of temperature detection cells.

16. A method according to claim 13, wherein during the testing step, the detection threshold is computed according to the relationship:

$$TD = T0 + (VS2 - VS1)/(X - Y)$$

T0 being the reference temperature, X and Y being the plurality of coefficients determined during the resetting step, VS1 representing the increasing voltage at the reference temperature, and VS2 representing the decreasing voltage at the reference temperature.

17. A method according to claim 16, wherein determining during the resetting step a first coefficient X among the plurality of coefficients, the voltage VS1 corresponding to the increasing voltage is measured at the reference temperature T0, and then a result is divided by the reference temperature T0.

18. A method according to claim 16, wherein determining during the resetting step a second coefficient Y among the plurality of coefficients, the voltage VS2 corresponding to the decreasing voltage s measured at two different temperatures, and then a slope of a line passing through the two measurement points is computed.

19. A method according to claim 16, wherein determining during the resetting step a second coefficient Y among the plurality of coefficients, the voltage VS2 corresponding to the decreasing voltage of two temperature detection cells is measured, and then a slope of a line passing through the two measurement points is computed.

20. A method according to claim 16, wherein determining during the resetting step the second coefficient Y, the voltage VS2 corresponding to the decreasing voltage of at least two temperature detection cells is measured, and then a slope of a line passing through the two measurement points is computed.

21. A method for determining a detection threshold for each temperature detection cell in a series of temperature detection cells coming from a same manufacturing process, each temperature detection cell comprising a first temperature circuit for producing an increasing voltage as a function of temperature, a second temperature circuit for producing a decreasing voltage as a function of the temperature, and a comparison circuit for providing a warning signal when the increasing voltage reaches the decreasing voltage signifying that the detection threshold has been reached, the method comprising:

during a resetting step, determining a plurality of constant coefficients X and Y related to the series of temperature detection cells; and during a testing step, determining the detection threshold TD of each temperature detection cell based upon measurements of the increasing voltage VS1 and the decreasing voltage VS2 at a reference temperature T0 and the plurality of temperature coefficients X and Y, the detection threshold TD being computed according to the relationship TD=T0+(VS2−VS1)/(X−Y).

22. A method according to claim 21, wherein the testing step is repeated for each temperature detection cell in the series of temperature detection cells; and wherein the resetting step is performed only once before the testing step.

23. A method according to claim 21, wherein the resetting step and the testing step are repeated for each temperature detection cell in the series of temperature detection cells.

24. A method according to claim 21, wherein determining during the resetting step the coefficient X, the voltage VS1 corresponding to the increasing voltage is measured at the reference temperature T0, and then a result is divided by the reference temperature T0.

25. A method according to claim 21, wherein determining during the resetting step the coefficient Y, the voltage VS2 corresponding to the decreasing voltage is measured at two different temperatures, and then a slope of a line passing through the two measurement points is computed.

26. A method according to claim 21, wherein determining during the resetting step the coefficient Y, the voltage VS2 corresponding to the decreasing voltage of two temperature detection cells is measured, and then a slope of a line passing through the two measurement points is computed.

27. A method according to claim 21, wherein determining during the resetting step the second coefficient Y, the voltage VS2 corresponding to the decreasing voltage of at least two temperature detection cells is measured, and then a slope of a line passing through the two measurement points is computed.

* * * * *